United States Patent [19]

Fey

[11] 4,000,245

[45] Dec. 28, 1976

[54] PROCESS FOR ARC HEATER PRODUCTION OF DEFLUORINATED PHOSPHATES

[75] Inventor: Maurice G. Fey, Plum Boro, Pa.

[73] Assignee: Westinghouse Electric Corporation, Pittsburgh, Pa.

[22] Filed: Feb. 20, 1973

[21] Appl. No.: 333,813

[52] U.S. Cl. .............................. 423/167; 204/164
[51] Int. Cl.² ...................... C01F 1/00; C01F 5/40; C01F 11/46
[58] Field of Search .......... 423/167, 322, 323, 305; 204/164

[56] References Cited

UNITED STATES PATENTS

| 2,143,865 | 1/1939 | Copson ............................ 423/167 |
| 2,220,575 | 11/1940 | Luscher ................................. 71/44 |
| 3,332,870 | 7/1967 | Orbach et al. ..................... 204/164 |
| 3,380,904 | 4/1968 | Goldberger ....................... 204/164 |
| 3,607,024 | 9/1971 | Vilesov et al. .................... 423/167 |
| 3,679,363 | 7/1972 | Skrivan ............................. 423/323 |
| 3,832,448 | 8/1974 | Longfield et al. ................. 423/322 |

OTHER PUBLICATIONS

*Industrial & Engineering Chemistry*, vol. 29, No. 7, Fertilizer from Rock Phosphate, Curtis et al.

Primary Examiner—Oscar R. Vertiz
Assistant Examiner—Eugene T. Wheelock
Attorney, Agent, or Firm—D. P. Cillo

[57] ABSTRACT

Tricalcium phosphate is made by reacting phosphate rock and a defluorinating reagent comprising steam, in the presence of a hyperheated heat transfer gas mixture comprising CO and $H_2$, at a temperature between about 1500° – 2200° C, and then separating the solid and gaseous materials.

9 Claims, 1 Drawing Figure

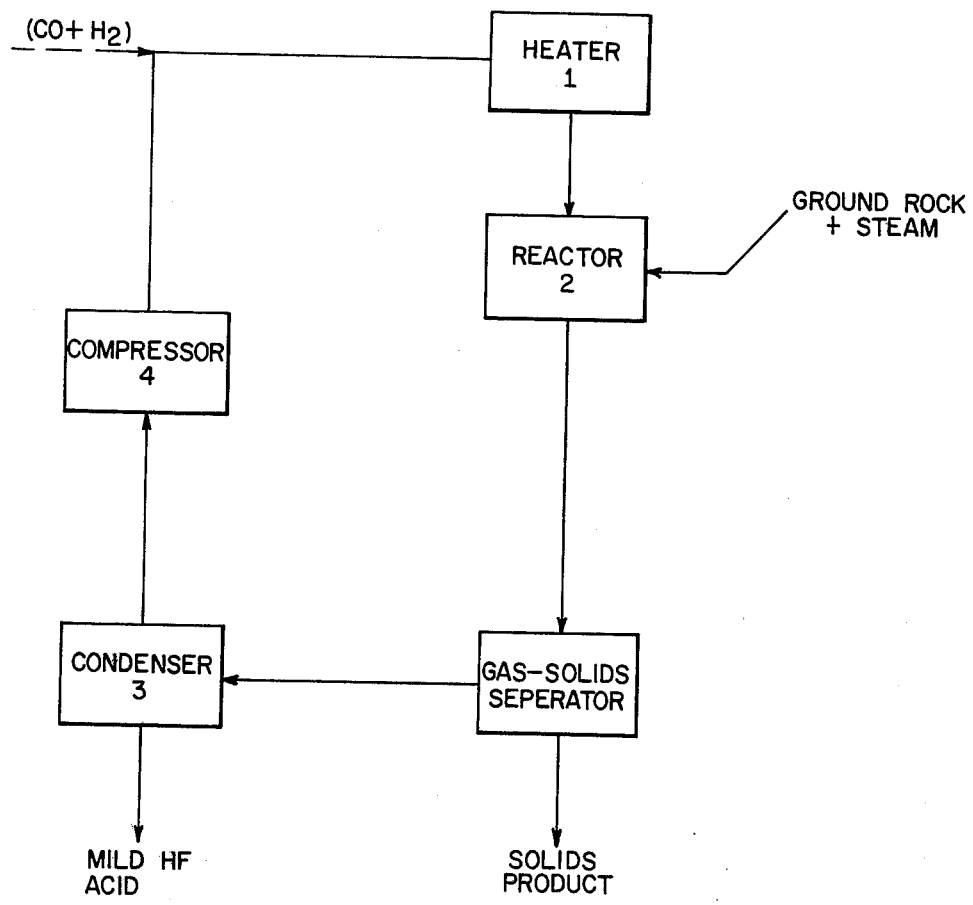

PROCESS FOR ARC HEATER PRODUCTION OF DEFLUORINATED PHOSPHATES

BACKGROUND OF THE INVENTION

The present invention generally relates to the manufacture of defluorinated food and feed grade phosphates from phosphate rock. Phosphate rock usually occurs as natural deposits of fluorapatite, a phosphate of lime containing varying amounts of fluorine, chlorine, hydroxyl, and silica and is generally represented by the formula $Ca_{10}(PO_4)_6F_2$. Many attempts have already been made to convert raw phosphates, with the assistance of added materials such as $SiO_2$, by fusion in the presence of steam (U.S. Pat. Nos. 2,143,865; 2,220,572; 2,895,799). The chemical reaction is as follows:

$$2Ca_5(PO_4)_3F + SiO_2 + H_2O \rightarrow 3Ca_3(PO_4)_2 + CaSiO_3 + 2HF$$

The energy necessary to drive this reaction at the desired temperature of about 1930° C is 1234 BTU per pound of solids produced. The required amount of steam would be:

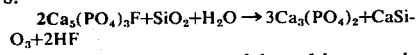

and the resultant steam enthalpy would be: 1234·0.0169=73,000BTU/lb. Enthalpies of this magnitude cannot be attained using existing arc heater equipment.

Presently, steam enthalpies of only up to 8,000 BTU/lb. are possible. A large excess of steam must be used, so that sufficient energy can be supplied to drive the reaction. In present processes, such large excesses of steam serve little chemical function, but merely act as a fairly inefficient heat carrier. The desired reaction temperature for rapid kinetics is 1930° therefore, only the energy invested in the steam above that temperature, i.e. an enthalpy in excess of 3500 BTU/lb. can be used to heat the reactants and supply the heat of reaction.

Process efficiency for this prior art method, using arc heated steam at 8,000 BTU/lb., has been calculated at about 44%, with a total electrical cost of about $17/ton of defluorinated phosphate, at a production rate of about 1,300 lb. rock/hr. There is a need for a faster, more efficient and economical method for arc heater production of defluorinated phosphates.

SUMMARY OF THE INVENTION

The improved process of this invention, for electric arc heater defluorination of fluorine-containing phosphatic material, utilizes a mixture of carbon monoxide and hydrogen gas, as a heat transfer medium, which may be continuously recirculated within the process. A stoichiometric mixture of steam and phosphate rock is fed into an arc hyperheated steam of CO and $H_2$ gas for chemical reaction.

BRIEF DESCRIPTION OF THE DRAWING

For a better understanding of the invention, reference may be made to the preferred embodiment exemplary of the invention, shown in the accompanying drawing, which is a flowsheet showing the process of this invention.

DESCRIPTION OF THE PREFERRED EMBODIMENTS

I have found that a mixture of carbon monoxide plus hydrogen gas, in molar (volumetric) proportions of between about $(1.0-5.0)H_2 + CO$, can be used as an efficient heat transfer medium in steam deflourination of phosphate rock.

Referring now to the drawing, in the process of this invention, a mixture of carbon monoxide plus hydrogen gas (synthesis gas), in volumetric proportions, preferably, of about $2H_2 + CO$, is fed into a heating means 1, in order to hyperheat the gas mixture to between about 2200° – 3200° C. The hyperheated heat transfer mixture containing carbon monoxide and hydrogen gas is then fed into a reactor 2, along with ground phosphate rock, a defluorination reagent such as steam and optionally a fluxing agent such as silica.

The resulting solid reaction products and gases are cooled and then separated. The solid reaction products will comprise $Ca_3(PO_4)_2$ and generally $CaSiO_3$, when silica is used in the reaction to react with excess calcium. The gases are then fed into a condenser 3, where mild HF acid is removed from the system and the mixture of carbon monoxide and hydrogen gas is recirculated back into the heating means 1 by compressor 4.

The heat transfer gas mixture of $H_2 + CO$ gas(synthesis gas) can be generated by steam cracking a light hydrocarbon such as natural gas. The synthesis gas is initially fed into a heating means, such as an arc heater. The arc heater apparatus can generally comprise two cylindrically shaped, hollow, axially aligned electrodes separated by a small annular gap. Such a device is described in U.S. Pat. No. 3,629,553. An electric arc, energized from an external electrical power source, is struck between the cylindrical electrodes in the gap. Because of the heat generated by the arc, cooling channels are often disposed against the outer perimeter of the cylindrical electrodes. The synthesis gas can be fed through a ducting means to the annular gap and introduced radially into the arc chamber, or the gas may be supplied at a point upstream of the annular gap so that it may flow downstream past the annular gap internal to the electrode and into the arc chamber.

Some arc heaters also provide toroidal or cylindrical electromagnetic field coils disposed adjacent to the outer surface of the cylindrical electrodes, to provide a magnetic field normal to the arc root which may be used to rotate the arc around the annular gap. Examples of arc heater apparatus employing cooling systems, electrically conducting systems and fluid admission systems may be found in U.S. Pat. Nos. 3,360,682 and 3,400,070.

Arc heater performance characteristics are excellent for operation on synthesis gas. Enthalpies of about 9,000 to 20,000 BTU/lb. can be achieved at about 85% arc heater efficiencies, by supplying about 1000 to 1200 kW arc power to produce a temperature of between 2200° – 3200° C. Arc heaters operating on synthesis gas also exhibit very low electrode erosion rates. Synthesis gas (CO plus $H_2$) has an additional advantage over the steam reactant doubling as a heat carrier as in the prior art, in that the enthalpy of synthesis gas at 1930° C is only about 1800 BTU/lb. Therefore, the available enthalpy from synthesis gas, to supply the heat of reaction is for example, about 9,200 BTU/lb. i.e. 11,000–1,800. This compares with an available enthalpy of 4,500 BTU/lb. i.e. 8,000 - 3,500, for an optimum steam operation.

After the synthesis gas is hyperheated to an enthalpy of about 9,000-20,000 BTU/lb., it is fed into a reaction chamber attached downstream from the arc heater apparatus. The ground phosphate rock, and steam acting as a defluorination reagent, will simultaneously be fed into the reaction chamber, which must be maintained at a temperature of between about 1500°- 2200° C.

The fluorine-containing phosphatic material may be phosphate rock, i.e. $Ca_5(F.Cl.OH) (PO_4)_3$ having a fluorine content between about 1-4wt% and a melting point of approximately 1450° C, or sulfuric or phosphoric acid treated phosphate rock materials, such as superphosphate, triple superphosphate and mixtures thereof. The steam defluorination reagent should be introduced into the fusion chamber with the phosphate rock in the ratio of up to about 2 moles fluorine contained in the phosphatic material to 1 mole steam.

Other ingredients beside steam, such as $SiO_2$ fluxing agent may be used in effective amounts to react with excess calcium. The steam defluorination reagent is used to reduce the fluorine content of the phosphatic material, which may be harmful for example to plants, livestock, or fowl so that the phosphorous to fluorine weight ratio is about 100 to 1 or greater.

The phosphate rock, $SiO_2$ fluxing agent and steam are injected into the hyperheated synthesis gas jet leaving the arc heater. The synthesis gas jet is enclosed by reactor walls. The reagents are heated to the reaction temperature by the synthesis gas jet and defluorination occurs.

The reaction product and synthesis gas are then fed into a gas-solids separator means, and the solid products comprising tricalcium phosphate removed from the system. The reaction product, which will comprise $Ca_3(PO_4)_2 + CaSiO_3 + HF$ when $SiO_2$ is used in the reactor along with the synthesis gas, will then be cooled to room temperature by a suitable liquid quenching or heat exchanger means. The gaseous products are then fed into a condenser means at about 20° C to remove the mild HF acid. The remaining $CO + H_2$ gas mixture may then feed into a compressor to be partially discharged to obtain the desired volume ratio of gasses or refed back into the arc heater.

Process efficiency for the method of this invention using arc heated synthesis gas as a heat transfer medium is about 66%, with a total electrical cost of about $11.50/ton rock at a production rate of about 1,900 lb. rock/hr. This process also reduces steam requirements by over 90%, so that much lower capacity heat exchange equipment is required to cool the gases leaving the reactor.

I claim:

1. A process for defluorination of fluorine-containing phosphatic material by:
   a. hyperheating a gas mixture consisting essentially of hydrogen and carbon monoxide to a temperature of over about 2200° C in a heating means, wherein the molar ratio of hydrogen:carbon monoxide is between about 1-5:1, to provide a heat transfer medium, and then
   b. feeding stoichiometric amounts of solid fluorine-containing phosphatic material and defluorinating reagent consisting essentially of steam, into the pressure of a continuous stream of the hyperheated gas mixture of hydrogen and carbon monoxide gas acting as a heat transfer medium, at a temperature of between about 1500° C to 2200° C, and then
   c. cooling the gases and solid reaction products and separating the gases from the solid reaction products, and finally
   d. feeding the gases into a means to remove HF acid and then recirculating the resulting hydrogen and carbon monoxide into the heating means.

2. The process of claim 1, wherein, the fluorine-containing phosphatic material is fluorapatite.

3. The process of claim 2, wherein $SiO_2$ fluxing agent is reacted with fluorapatite and steam.

4. The process of claim 2, wherein the gas mixture consisting essentially of hydrogen and carbon monoxide has an enthalpy of between about 9,000-20,000 BTU/lb., and is heated in an electric arc heater.

5. The process of claim 2, wherein the steam is heated to a temperature of between about 1500° C to 2200° C.

6. The process of claim 1 wherein the solid reaction product comprises $Ca_3(PO_4)_2$.

7. A process for defluorination of fluorine containing phosphatic material by:
   a. hyperheating a gas mixture consisting of hydrogen and carbon monoxide to a temperature of between about 2200° C to 3200° C in a heating means, wherein the molar ratio of hydrogen:carbon monoxide is between about 1-5:1, to provide a heat transfer medium, and then
   b. continuously feeding the hyperheated hydrogen and carbon monoxide gas heat transfer medium into a reaction chamber and simultaneously feeding stoichiometric amounts of solid fluorine containing phosphatic material and defluorinating reagent consisting of steam into the presence of the heat transfer medium at a temperature of between about 1500° C to 2200° C, and then
   c. cooling the gases and solid reaction products and separating the gases from the solid reaction products, said solid reaction products having a phosphorous to fluorine weight ratio of 100 to 1 or greater, and finally
   d. feeding the gases into a means to remove HF acid and then recirculating the resulting hydrogen and carbon monoxide into the heating means.

8. The process of claim 7, wherein the fluorine containing phosphatic material is fluorapatite.

9. The process of claim 8, wherein $SiO_2$ fluxing agent is reacted with fluorapatite and steam.

* * * * *